May 1, 1934.   A. KINDELMANN ET AL   1,957,174
SHUTTER ADJUSTMENT
Filed April 4, 1931   3 Sheets-Sheet 1

INVENTORS
Albert Kindelmann.
Ewald Boecking.
BY their ATTORNEYS

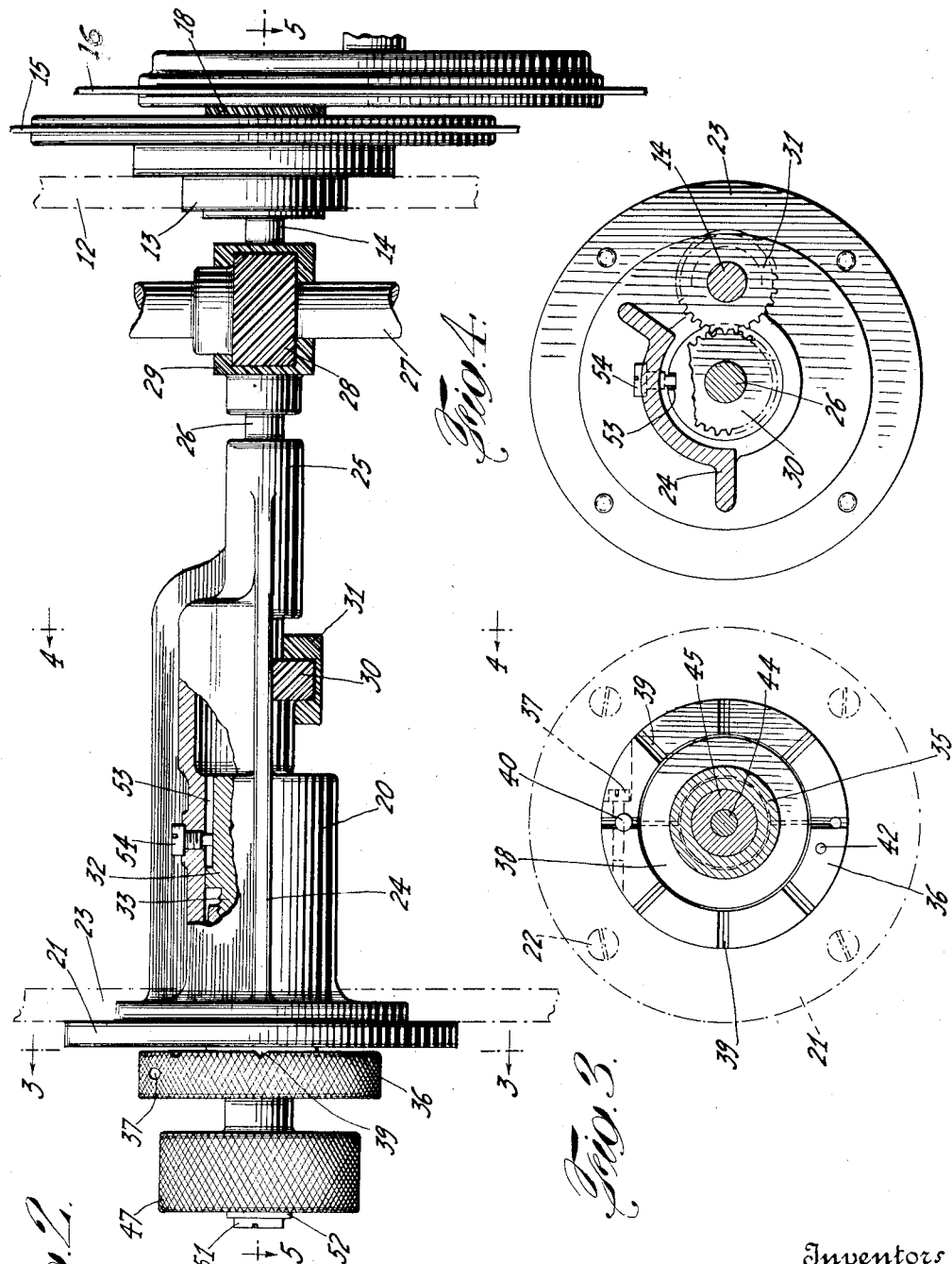

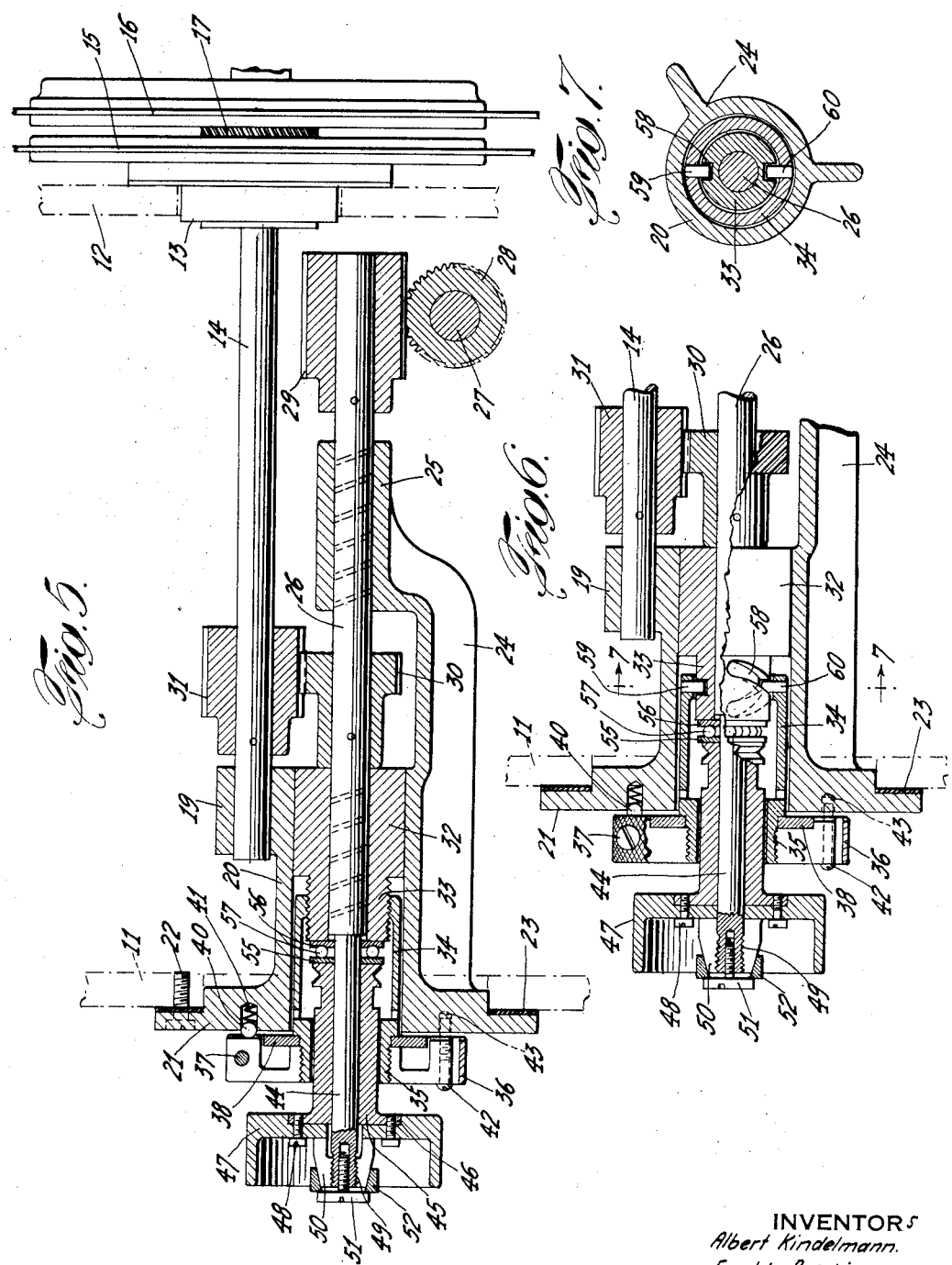

Patented May 1, 1934

1,957,174

UNITED STATES PATENT OFFICE 1,957,174

SHUTTER ADJUSTMENT

Albert Kindelmann, Floral Park, and Ewald Boecking, Brooklyn, N. Y., assignors to International Projector Corporation, New York, N. Y., a corporation of Delaware Application April 4, 1931, Serial No. 527,760

11 Claims. (Cl. 88—17)

This invention relates to motion picture apparatus with especial reference to new and useful improvements in shutter adjusting mechanism especially for motion picture projectors.

A main object of the invention is to provide a simple, compact, durable and efficient construction whereby the shutter may be adjusted quickly and easily either when at rest or while it is being driven.

A further object is to provide a simple means whereby the entire drive mechanism of the projector can be slowly turned either for examination or cleaning thereof by the turning of a single knob associated with the shutter mechanism.

A still further object is to provide simple and efficient means whereby the shutter adjusting mechanism can be easily and readily manipulated and adjusted with a very fine degree of accuracy and latched in predetermined adjusted positions to avoid the likelihood of dislodgment of the adjustment by accidental contact or by jarring.

A still further object is to provide shutter adjusting mechanism which is simple, compact, readily assembled and disassembled for adjustment and repair.

Further and more specific objects, features and advantages will more clearly appear from a consideration of the specification hereinafter taken in connection with the accompanying drawings which form part of the specification and which illustrate a present preferred form of the invention.

Briefly considered the invention in its broader aspects comprises the combination with a shutter shaft and a driving shaft therefor of an intermediate shaft interconnected therebetween with a manually operable knob detachably clamped to the intermediate shaft to permit the shutter shaft and the drive mechanism to be turned while the machine is not under power so that a mechanic who is repairing or cleaning the machine can turn the movable parts for ready inspection, cleaning and repairing. The invention further comprises a compact housing for the intermediate shaft with suitable member such as a plug thereon, said plug being connected to a disk in such manner that the turning of the disk to predetermined positions will slide the plug axially and move the shaft with it. The intermediate shaft being so connected to the shutter shaft that its axial displacement will turn the shutter shaft and consequently move it a required amount. Simple means are provided for latching and in some cases locking the adjustable disk or plate in desired positions so that when the shutter is adjusted, accidental jarring or contact with the adjusting disk will not disturb the adjustment.

The present preferred form of the invention is shown in the drawings, of which:

Fig. 2 is an enlarged side elevation partly broken away of the shutter support, drive, and adjustment;

Fig. 3 is a transverse section taken on the line 3—3 of Fig. 2;

Fig. 4 is a similar section taken on the line 4—4 of Fig. 2;

Fig. 5 is a horizontal section taken on the line 5—5 of Fig. 2;

Fig. 6 is an enlarged partially horizontal section similar to Fig. 5; but of a modified form of the invention; and Fig. 7 is a section taken on the line 7—7 of Fig. 6.

Figure 1:
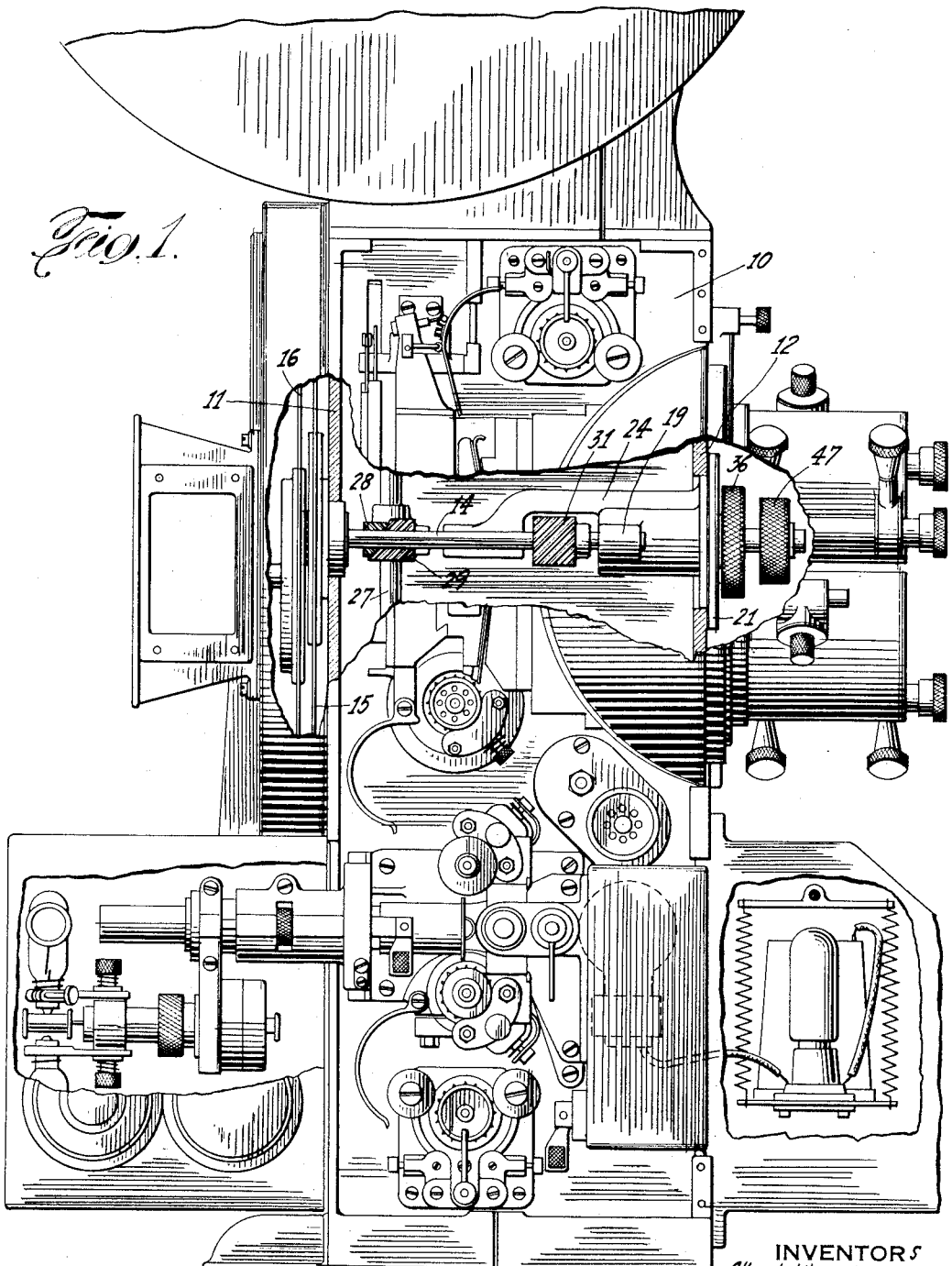
Fig. 1 is a side elevation with portions broken away of a machine embodying the invention and preferably adapted for talkie-picture projection.

The invention herein concerns the driving, the support, and the adjustment of a shutter or shutters on a motion picture machine preferably a projector.

The mechanism for achieving the objects of the invention is mounted on and within the projection head 10 of the machine and is separated respectively from the front and rear walls 11 and 12 of the frame of said head or casing. The rear wall 12 is provided with an opening receiving a bearing unit 13 housing the one end of the shutter shaft 14. Outside this wall are shown disposed a pair of shutters 15 and 16 driven preferably in opposite directions by suitable gears one of which is 17, shown in Fig. 5, and the other 18, shown in Fig. 2.

The shutter 16 may be supported from any suitable bracket or support connected to the frame, not shown. The opposite end of the shutter shaft 14 is journalled in a bearing head 19 formed on a supporting member 20 in the form of a sleeve-like elongated casing having an enlarged flange-like head 21 fastened by screws 22 to the frame wall 11, with an intermediate layer 23, of cushioning material therebetween, such as rubber. The main body of the supporting member 20 extends through an opening in the wall 11 and is along a portion of its length in the form of a sleeve on which the bearing head 19 is formed.

The supporting member is further extended by an off-set portion 24 at the further end of which there is formed an additional bearing member 25 for the shutter drive shaft 26. A main drive shaft of the machine is shown at 27 and is connected to the driving motor or source of power in any suitable manner, not shown. A gear 28 on said shaft meshes with a gear 29 fixed to the end of the shutter drive shaft 26. A spiral gear 30 intermediate the length of shaft 26 meshes with a spiral gear 31 on the shutter shaft 14. The rotation of shaft 27 will cause the rotation of the shutters 15 and 16 through the intermediary of the gears above-described. The same drive mechanism will be adapted to drive a single shutter instead of two shutters as shown.

Within the sleeve like portion of the supporting member 20 is disposed a bored suitable bearing member or plug 32 slidable within this portion and acting as a bearing member for shaft 26. This plug is disposed closely adjacent gear 30. A threaded extension 33 of reduced diameter on the plug extends into a threaded bore in a cup-like casing 34 which is loosely and rotatably disposed within the sleeve portion of spiral member 20. This casing 34 has a threaded extension 35 on which is screwed a split cap 36 clamped in position by means of a screw 37. A washer 38 is snugly mounted on the end of the casing 34 and bears against the adjacent face of the flange portion 21. The inner face of the cap 36 is provided with a plurality of spaced notches at 39, (Fig. 3), which are adapted to register respectively with a ball 40 as the cap is rotated. This ball lies in a recess in the flange 21 and is backed by a spring 41. The cap is also provided with a screw 42 which can be tightened up to project into any one of several holes 43 formed in the outer face of flange 21.

The shaft 26 at its end has a reduced portion 44 and on this reduced portion there is mounted a bored spindle 45 having an outer flange head 46. To this flange portion a knob 47 is fastened by means of screws 48. The outer end of this extension 44 is threaded as at 49 to receive a multi-armed spider 50, the legs of which bear against the inner face of the knob 47. A screw threadably projects into the end of the shaft 44 and has an enlarged flat head 51 bearing against a wedge-shaped clamping ring 52 loosely disposed on the outer sloping surface of the spider member 50. The spindle 45 projects loosely through the casing 35 and this casing 35 projects loosely into the sleeve-like portion 20.

The plug 32, as shown in Fig. 2, has a longitudinal groove 53 in its face and a set screw 54 mounted on the side wall of the supporting member 20 projects into said groove permitting longitudinal movement of the plug 32 but preventing rotation thereof. Between the inner end of spindle 45 and the adjacent end 33 of the plug 32 are loosely mounted washer rings 55 and 56 between which are disposed a series of ball bearings 57. In the modification shown in Fig. 6 the construction is identically the same except for the reduced portion 33 of the plug 32 which is not threaded but has a spiral groove 58 therein, in which project a pair of operatively disposed pins 59 and 60 on the inner end of the casing 34.

In the operation of the device, the rotation of shaft 27 through the described gearing operates a shutter mechanism whether that mechanism comprises one or more shutters. When the driving mechanism is not moving and the operator is working on the machine to clean the same and desires to move the entire mechanism without connecting the drive power, it will be seen that turning the knob 47 which is connected to the shaft 26 through the extension 44 will permit him to turn the shaft 26 and by the connection through gears 28 and 29 to the main drive shaft 27, the entire mechanism within the machine can be turned at a suitable speed to permit him to examine it and clean it.

It will be seen that by loosening the screw head 51, the wedging clamping connection through the ring 52 and spider member 50 to the knob 47 can be loosened to permit the shaft 26 to rotate without turning the knob 47 and the spider 45, if desired, but ordinarily this screw is tightened up so that the knob 47 rotates with the shaft.

It will also be seen that the plug 32 does not turn but only slips back and forth in the bore and supporting member 20. This longitudinal sliding movement of the plug 32 is effected by turning the cap 36. As the cap is turned, the casing 34 is turned which by means of its threaded connection with plug 32 causes this plug 32 to move backward or forward depending upon the direction of rotation of the cap 36. Because the plug 32 is snugly mounted between the gear 30 and the spindle 45 it will be seen that this gear, fixed to the shaft 26 will be caused to move back and forth with the plug and the shaft 26.

The fact that gears 30 and 31 are spiral gears and because the shaft 26 can not turn because of the inertia of all of the drive apparatus to which it is connected, while at rest, the longitudinal movement of the gear 30 will cause the turning of gear 31 with the consequent turning of shaft 14 and the angular adjustment of one or all of the shutters mounted on or associated by the gear with the shaft 14.

The same adjustment through the cap 36 can be effected, of course, while the shutter is being driven, thus enabling the shutter adjustment to be made at any time for the purpose of coordinating the shutter timing with that of the other associated mechanisms in the machine. The coaction between the ball 40 and the notches 39 will permit the cap 36 to be set in predetermined position. In order to fix the cap 36 in these positions so that accidental contact will not disturb the shutter adjustment, the screw 42 is screwed into the respective hole 43 opposite which it is disposed in any given adjustment of the cap 36. There are a number of these holes 43 corresponding in number and position to the notches 39, so that in each position of the cap the screw 42 will be disposed opposite a corresponding hole 43 so that the cap can be fixed in this position, if desired.

It will thus be seen that the invention is simple, compact, rugged and permits quick and easy adjustment of the shutter and provides elements whereby the adjustment can be made permanent for such time as is desired, and prevent accidental dislodgment of the parts. It is also seen that when the machine is at rest the entire movable mechanism can be slowly turned by the movement of knob 47 to permit the movable parts to be slowly turned over for examination and cleaning. The shutter or shutters may be adjusted either while the machine is at rest or while the mechanism is in motion.

While the invention has been described in detail and with respect to a present preferred form thereof it is not to be limited to such details and forms since many changes and modifications may be made in the invention without departing from the spirit and scope of the invention in its broadest aspects. Hence it is desired to cover any and all forms and modifications of the invention which may come within the language or scope of any one or more of the appended claims.

What is claimed, is:

1. In a motion picture projector, a shutter shaft, a drive shaft, an intermediate shaft, gearing on said shafts to effect the motion of the shutter shaft from the drive shaft, a spindle on the intermediate shaft, loosely mounted, a knob on said spindle, a multi-armed spider connected to the end of the intermediate shaft and bearing against said shaft, a wedge-shaped ring on the spider and a headed screw adjustable on the end of the intermediate shaft to connect said ring and clamp the spindle and knob to the shaft.

2. In a motion picture projector, a drive shaft, a shutter shaft, an intermediate shaft, interconnected gearing on said shafts to effect the movement of the shutter shaft from the drive shaft, a spindle on the end of the intermediate shaft, a slidable plug disposed around said intermediate shaft between said spindle and one of said gears and means for moving said plug axially of the intermediate shaft to move said shaft axially.

3. In a motion picture projector, a drive shaft, a shutter shaft, an intermediate shaft, interconnected gears between the intermediate shaft and the drive shaft, connected gears on the shutter shaft and the intermediate shaft, said last two gears being spiral gears, a frame, means for supporting said shafts from said frame and means on the frame and engaging the intermediate shaft to move it axially.

4. In a motion picture projector, a drive shaft, a shutter shaft, an intermediate shaft, interconnected gears between the intermediate shaft and the drive shaft, connected gears on the shutter shaft and the intermediate, said last two gears being spiral gears, a frame, means for supporting said shafts from said frame and means on the frame and engaging the intermediate shaft to move it axially independent of the rotation of said shaft.

5. In a motion picture projector, a drive shaft, a shutter shaft, an intermediate shaft, intermediate connected spiral gears fixed to said shafts, a spindle fastened to said intermediate shaft, a slidable plug disposed between the spindle and the gearing of the intermediate shaft, means for preventing rotation of said plug while permitting axial movement thereof, and rotatable means on the frame engaging said plug to axially move said plug to effect the axial movement of the intermediate shaft.

6. In a motion picture projector, a drive shaft, a shutter shaft, an intermediate shaft, intermediate connected spiral gears fixed to said shafts, a spindle fastened to said intermediate shaft, a slidable plug disposed between the spindle and the gearing of the intermediate shaft, means for preventing rotation of the said plug while permitting axial movement thereof, and rotatable means on the frame engaging said plug to axially move said plug to effect the axial movement of the intermediate shaft, and means for fixing said turnable means in any one of several predetermined positions.

7. In a motion picture projector, a shutter driving shaft, a spindle fastened to said shaft, a gear fastened to said shaft and spaced from said spindle, a plug disposed between the gear and the spindle around the shaft, a casing having a bore through which said shaft extends, and in which said plug slides, means on the casing engaging with the plug to permit axial movement thereof but to prevent annular movement thereof, a rotatable member on said casing and engaging said plug, and means cooperating between the rotatable member and the plug to axially move the plug when said member is rotated.

8. In a motion picture projector, a shutter driving shaft, a spindle fastened to said shaft, a gear fastened to said shaft and spaced from said spindle, a plug disposed between the gear and the spindle around the shaft, a casing having a bore through which said shaft extends, and in which said plug slides, means on the casing engaging with the plug to permit axial movement thereof but to prevent annular movement thereof, a rotatable member on said casing and engaging said plug, and means cooperating between the rotatable member and the plug to axially move the plug when said member is rotated, and means for fixing the rotatable member in any one of several adjusted positions.

9. In a motion picture projector, a frame, a bored supporting casing mounted on said frame, a shutter driving shaft disposed longitudinally of said bore, and spaced from said casing, a plug surrounding said shaft and slidable in said bore, said plug having a groove and a pin on the casing projecting into the groove to permit longitudinal movement of the plug but to prevent annular movement thereof, a threaded extension on said plug, a rotatable shell having a portion threadably engaging with said extension plate or disk on said shell disposed adjacent the frame and turnable to axially displace said plug, a spindle fixed to the shaft on one side of said element and a gear fastened to the shaft on the other side of said plug.

10. In a motion picture projector, a frame, a bored supporting casing mounted on said frame, a shutter driving shaft disposed longitudinally of said bore, and spaced from said casing, a plug surrounding said shaft and slidable in said bore, said plug having a groove and a pin on the casing projecting into the groove to permit longitudinal movement of the plug but to prevent annular movement thereof, a threaded extension on said plug, a rotatable shell having a portion threadably engaging with said extension plate or disk on said shell disposed adjacent the frame and turnable to axially displace said plug, a spindle fixed to the shaft on one side of said element and a gear fastened to the shaft on the other side of said plug, said plate or disk having a series of notches in the face thereof adjacent the frame and a spring pressed ball disposed in the recess in said frame to latch the disk in any one of several positions.

11. In a motion picture projector, a frame, a bored supporting casing mounted on said frame, a shutter driving shaft disposed longitudinally of said bore, and spaced from said casing, a plug surrounding said shaft and slidable in said bore, said plug having a groove and a pin on the casing projecting into the groove to permit longitudinal movement of the plug but to prevent annular movement thereof, a threaded extension on said plug, a rotatable shell having a portion threadably engaging with said extension plate or disk on said shell disposed adjacent the frame and turnable to axially displace said plug, a spindle fixed to the shaft on one side of said element and a gear fastened to the shaft on the other side of said plug, said plate or disk having a series of notches in the face thereof adjacent the frame and a spring pressed ball disposed in the recess in said frame to latch the disk in any one of several positions, said frame having a plurality of predetermined holes therein and a set screw on the disk adapted to engage in any one of these holes to lock the disk in any one of several adjusted positions.

ALBERT KINDELMANN.
EWALD BOECKING.